US008902726B1

(12) United States Patent
Zhao et al.

(10) Patent No.: US 8,902,726 B1
(45) Date of Patent: *Dec. 2, 2014

(54) FRAME SYNCHRONIZATION TECHNIQUES (71) Applicant: Marvell International Ltd., Hamilton (BM)

(72) Inventors: Qing Zhao, Milpitas, CA (US); Leilei Song, Sunnyvale, CA (US); Chuxiang Li, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 19 days.

This patent is subject to a terminal disclaimer.

(21) Appl. No.: 13/727,331

(22) Filed: Dec. 26, 2012

Related U.S. Application Data (63) Continuation of application No. 12/540,753, filed on Aug. 13, 2009, now Pat. No. 8,345,533.

(60) Provisional application No. 61/089,586, filed on Aug. 18, 2008.

(51) Int. Cl.
*H04J 11/00* (2006.01)
*H04W 56/00* (2009.01)

(52) U.S. Cl.
CPC .................. *H04W 56/001* (2013.01)
USPC .......................................... 370/208; 370/334

(58) Field of Classification Search
USPC ......... 370/350, 503, 208, 210, 344, 347, 342, 370/498; 375/260, 347, 278
See application file for complete search history.

(56) References Cited

U.S. PATENT DOCUMENTS

| | | | |
|---|---|---|---|
| 4,449,190 A | 5/1984 | Flanagan et al. |
| 5,623,474 A | 4/1997 | Oshio et al. |
| 5,778,029 A | 7/1998 | Kaufmann |
| 6,031,628 A | 2/2000 | Jacob et al. |
| 6,222,889 B1 | 4/2001 | Lee |
| 6,255,906 B1 | 7/2001 | Eidson et al. |
| 6,266,517 B1 | 7/2001 | Fitzpatrick et al. |
| 6,275,685 B1 | 8/2001 | Wessel et al. |
| 6,639,944 B1 | 10/2003 | De Haan et al. |
| 6,667,659 B2 | 12/2003 | Stengel et al. |
| 6,731,406 B1 | 5/2004 | Ganapathy et al. |
| 6,829,313 B1 | 12/2004 | Xu |
| 6,912,249 B2 | 6/2005 | Haartsen |
| 6,950,469 B2 | 9/2005 | Karczewicz et al. |
| 6,983,026 B2 | 1/2006 | Pinckley et al. |
| 7,023,941 B1 | 4/2006 | Rey et al. |
| 7,173,992 B2 | 2/2007 | Frigon |
| 7,180,901 B2 | 2/2007 | Chang et al. |

(Continued)

OTHER PUBLICATIONS

"Non-Final Office Action", U.S. Appl. No. 13/182,004, Oct. 22, 2013, 14 pages.

(Continued)

*Primary Examiner* — Dady Chery (57) ABSTRACT

Frame synchronization techniques are described. In an implementation, a method implemented by a device includes using an objective function to form a list of values for a plurality of time trials, the time trials taken from a scan of a wireless signal having a plurality of channels. A single one of the values is selected for each of the plurality of channels to detect a preamble of a frame in the wireless signal. If the preamble is not detected as a result of the selecting, at least one additional value is chosen from the list for a respective channel to detect the preamble of the frame in the wireless signal.

20 Claims, 6 Drawing Sheets

(56) References Cited

U.S. PATENT DOCUMENTS

| | | | |
|---|---|---|---|
| 7,200,799 | B2 | 4/2007 | Wang et al. |
| 7,213,194 | B2 | 5/2007 | Nieminen |
| 7,262,722 | B1 | 8/2007 | Jahanghir et al. |
| 7,360,141 | B2 | 4/2008 | Michel et al. |
| 7,362,818 | B1 | 4/2008 | Smith et al. |
| 7,418,057 | B2 | 8/2008 | Shako et al. |
| 7,447,274 | B2 | 11/2008 | Shako et al. |
| 7,450,641 | B2 | 11/2008 | Sun et al. |
| 7,466,762 | B2 | 12/2008 | Shako et al. |
| 7,532,590 | B2 | 5/2009 | Ok et al. |
| 7,599,431 | B1 | 10/2009 | Anderson et al. |
| 7,675,886 | B2 | 3/2010 | Agrawal et al. |
| 7,702,020 | B2 | 4/2010 | Gallant et al. |
| 7,706,475 | B1 | 4/2010 | Koikare et al. |
| 7,782,973 | B2 | 8/2010 | Kim et al. |
| 7,822,147 | B2 | 10/2010 | Huang et al. |
| 7,965,710 | B1 | 6/2011 | Choi |
| 7,969,964 | B2 | 6/2011 | Kim et al. |
| 7,991,063 | B2 | 8/2011 | Khan et al. |
| 8,014,737 | B2 | 9/2011 | Pratt et al. |
| 8,059,588 | B2 | 11/2011 | Sood |
| 8,059,630 | B2 | 11/2011 | Prateek |
| 8,160,150 | B2 | 4/2012 | Moore |
| 8,311,031 | B2 | 11/2012 | Kim et al. |
| 8,345,533 | B1 | 1/2013 | Zhao |
| 8,345,714 | B2 | 1/2013 | Ryu et al. |
| 8,411,709 | B1 | 4/2013 | Choi et al. |
| 8,542,571 | B2 | 9/2013 | Kim et al. |
| 8,576,830 | B2 | 11/2013 | Swarts et al. |
| 8,614,994 | B2 | 12/2013 | Swarts et al. |
| 8,681,730 | B2 | 3/2014 | Swarts et al. |
| 8,817,771 | B1 | 8/2014 | Zhao et al. |
| 2002/0053058 | A1 | 5/2002 | Lee et al. |
| 2002/0067773 | A1 | 6/2002 | Jackson et al. |
| 2002/0072346 | A1 | 6/2002 | Kato et al. |
| 2002/0145985 | A1 | 10/2002 | Love et al. |
| 2003/0098804 | A1 | 5/2003 | Ekstrand et al. |
| 2003/0108135 | A1 | 6/2003 | Frigon |
| 2003/0126551 | A1 | 7/2003 | Mantha et al. |
| 2003/0164736 | A1 | 9/2003 | Stengel et al. |
| 2003/0179831 | A1 | 9/2003 | Gupta et al. |
| 2004/0090909 | A1 | 5/2004 | Khlat |
| 2004/0141525 | A1 | 7/2004 | Bhushan et al. |
| 2004/0148546 | A1 | 7/2004 | Meyer et al. |
| 2004/0223473 | A1 | 11/2004 | Ha et al. |
| 2004/0232984 | A1 | 11/2004 | Meade et al. |
| 2005/0018519 | A1 | 1/2005 | Nii |
| 2005/0213661 | A1 | 9/2005 | Xiang et al. |
| 2005/0231292 | A1 | 10/2005 | Akahori et al. |
| 2005/0243946 | A1 | 11/2005 | Chung et al. |
| 2005/0276266 | A1 | 12/2005 | Terry |
| 2006/0084389 | A1 | 4/2006 | Beale et al. |
| 2006/0174236 | A1 | 8/2006 | Stein et al. |
| 2006/0227895 | A1 | 10/2006 | Booth et al. |
| 2007/0016838 | A1 | 1/2007 | Mielczarek et al. |
| 2007/0025448 | A1 | 2/2007 | Cha et al. |
| 2007/0092013 | A1 | 4/2007 | Cahn et al. |
| 2007/0118791 | A1 | 5/2007 | Hepler et al. |
| 2007/0135065 | A1 | 6/2007 | Leffel et al. |
| 2007/0241812 | A1 | 10/2007 | Yang et al. |
| 2008/0031376 | A1 | 2/2008 | Ban |
| 2008/0043702 | A1 | 2/2008 | Moon et al. |
| 2008/0049709 | A1 | 2/2008 | Pan et al. |
| 2008/0074289 | A1 | 3/2008 | Sauder et al. |
| 2008/0089282 | A1 | 4/2008 | Malladi et al. |
| 2008/0090583 | A1 | 4/2008 | Wang et al. |
| 2008/0094280 | A1 | 4/2008 | Fenton |
| 2008/0219373 | A1 | 9/2008 | Zhang et al. |
| 2008/0270344 | A1 | 10/2008 | Yurick et al. |
| 2008/0279322 | A1 | 11/2008 | Franovici et al. |
| 2009/0097533 | A1 | 4/2009 | Lakkis |
| 2009/0103622 | A1 | 4/2009 | Tripathi et al. |
| 2009/0181622 | A1 | 7/2009 | Hardacker |
| 2009/0213946 | A1 | 8/2009 | Dick et al. |
| 2009/0257526 | A1 | 10/2009 | Wang et al. |
| 2009/0310704 | A1 | 12/2009 | Jethanandani et al. |
| 2010/0035554 | A1 | 2/2010 | Ba et al. |
| 2010/0061306 | A1 | 3/2010 | Ryu et al. |
| 2010/0077275 | A1 | 3/2010 | Yu et al. |
| 2010/0135257 | A1 | 6/2010 | Higuchi et al. |
| 2010/0239034 | A1 | 9/2010 | Lee et al. |
| 2011/0007717 | A1 | 1/2011 | Swarts et al. |
| 2011/0007718 | A1 | 1/2011 | Swarts et al. |
| 2011/0013730 | A1 | 1/2011 | Mansson et al. |
| 2013/0021976 | A1 | 1/2013 | Yang et al. |
| 2013/0142060 | A1 | 6/2013 | Challa et al. |

OTHER PUBLICATIONS

"Non-Final Office Action", U.S. Appl. No. 13/182,004, May 21, 2013, 9 pages.

"Advisory Action", U.S. Appl. No. 11/945,183, Nov. 9, 2010, 2 pages.

"Advisory Action", U.S. Appl. No. 11/945,151, Nov. 22, 2010, 3 pages.

Zhang, et al., U.S. Appl. No. 12/098,222, filed Apr. 4, 2008, 78 pages.

"Final Office Action", U.S. Appl. No. 12/510,716, Jun. 28, 2012, 10 pages.

"Final Office Action", U.S. Appl. No. 12/397,057, Apr. 27, 2012, 11 pages.

"Final Office Action", U.S. Appl. No. 11/945,183, Sep. 13, 2010, 12 pages.

"Final Office Action", U.S. Appl. No. 12/574,879, Nov. 20, 2012, 13 pages.

"Final Office Action", U.S. Appl. No. 12/269,744, Sep. 19, 2012, 13 pages.

"Final Office Action", U.S. Appl. No. 11/945,151, Aug. 26, 2011, 20 pages.

"Final Office Action", U.S. Appl. No. 11/945,151, Sep. 10, 2010, 27 pages.

"Final Office Action", U.S. Appl. No. 12/511,606, Sep. 13, 2012, 8 pages.

"Non-Final Office Action", U.S. Appl. No. 12/397,057, Aug. 1, 2012, 10 pages.

"Non-Final Office Action", U.S. Appl. No. 12/269,744, Aug. 18, 2011, 10 pages.

"Non-Final Office Action", U.S. Appl. No. 12/574,879, Jun. 4, 2012, 11 pages.

"Non-Final Office Action", U.S. Appl. No. 12/767,922, Nov. 2, 2012, 12 pages.

"Non-Final Office Action", U.S. Appl. No. 12/269,744, Feb. 16, 2012, 14 pages.

"Non-Final Office Action", U.S. Appl. No. 12/540,753, Apr. 5, 2012, 14 pages.

"Non-Final Office Action", U.S. Appl. No. 12/253,078, Jun. 8, 2012, 18 pages.

"Non-Final Office Action", U.S. Appl. No. 11/945,151, Apr. 26, 2012, 20 pages.

"Non-Final Office Action", U.S. Appl. No. 11/945,151, Mar. 25, 2010, 22 pages.

"Non-Final Office Action", U.S. Appl. No. 11/945,151, Mar. 28, 2011, 22 pages.

"Non-Final Office Action", U.S. Appl. No. 12/511,606, Jan. 4, 2012, 6 pages.

"Non-Final Office Action", U.S. Appl. No. 12/511,629, Apr. 13, 2012, 6 pages.

"Non-Final Office Action", U.S. Appl. No. 12/397,057, Nov. 9, 2011, 7 pages.

"Non-Final Office Action", U.S. Appl. No. 12/510,716, Nov. 8, 2011, 8 pages.

"Non-Final Office Action", U.S. Appl. No. 11/945,183, Apr. 5, 2010, 8 pages.

"Notice of Allowance", U.S. Appl. No. 12/540,753, Aug. 27, 2012, 5 pages.

"Notice of Allowance", U.S. Appl. No. 11/945,183, Feb. 23, 2011, 7 pages.

(56) References Cited

OTHER PUBLICATIONS

"Notice of Allowance", U.S. Appl. No. 11/945,151, Nov. 23, 2012, 8 pages.
"Part 16: Air Interface for Fixed and Mobile Broadband Wireless Access Systems; Amendment 2: Physical and Medium Access Control Layers for Combined Fixed and Mobile Operation in Licensed Bands", IEEE Std 802.16e, Feb. 28, 2006, 822 pages.
"Part 16: Air Interface for Fixed Broadband Wireless Access Systems", IEEE Std. 802.16, Oct. 1, 2004, 857 pages.
"Restriction Requirement", U.S. Appl. No. 12/269,744, Jun. 22, 2011, 6 pages.
"Supplemental Notice of Allowance", U.S. Appl. No. 11/945,151, Mar. 6, 2013, 2 pages.
Mujtaba, Syed "TGn Sync Proposal Technical Specification", IEEE 802.11-04 / Wireless LANs, May 2005, pp. 1-131.
"Non-Final Office Action", U.S. Appl. No. 13/836,896, Apr. 28, 2014, 11 pages.
"Notice of Allowance", U.S. Appl. No. 13/182,004, Apr. 9, 2014, 7 pages.
"Notice of Allowance", U.S. Appl. No. 13/836,896, Sep. 16, 2014, 4 pages.

FRAME SYNCHRONIZATION TECHNIQUES

RELATED APPLICATIONS

This application is a continuation of and claims priority to U.S. Provisional patent application Ser. No. 12/540,753, filed on Aug. 13, 2009 which claims priority to U.S. Provisional Application Ser. No. 61/089,586, filed on Aug. 18, 2008, the disclosure of which is herein incorporated by reference in its entirety.

BACKGROUND

A wide variety of techniques are usable to communicate wirelessly between devices. One such technique is referred to as WiMAX, which is an acronym for Worldwide Interoperability for Microwave Access and is commonly used to refer to Institute of Electrical and Electronics Engineers (IEEE) 802.16 standards. WiMAX is a wireless broadband technology that supports a variety of transmission modes, such as point to multi-point (PMP) broadband wireless access.

WiMAX techniques communicate wirelessly through the use of frames. In order to detect a frame, a preamble is specified for the frame that provides a reference for frame synchronization, which frame synchronization is used to establish frame timing and initial symbol timing for the frame. The preamble employs a symbol structure to establish fixed relationships among subcarriers of a signal and to indicate a start of a downlink frame. These fixed relationships are usable to minimize effects of distortions and interruptions, such as to adjust a timing offset, a frequency offset, transmitted signal power, and so on. In some instances, however, conventional techniques used for frame synchronization fail by detecting a false synchronization frame, interference in an upload/download gap, and so on.

SUMMARY

Frame synchronization techniques are described. In an implementation, a method implemented by a device involves using an objective function to form a list of values for a plurality of time trials. The time trials are taken from a scan of a wireless signal having a plurality of channels. A single one of the values is selected for each of the plurality of channels to detect a preamble of a frame in the wireless signal. If the preamble is not detected as a result of the selection, at least one additional value is chosen from the list for a respective channel to detect the preamble of the frame in the wireless signal.

In an implementation, a mobile device includes an antenna and one or more modules to perform frame synchronization. Frame synchronization is performed by the one or more modules upon receiving a wireless signal having a plurality of channels via the antenna. At least two values are used that are computed using an objective function to attempt to detect a preamble of a frame in the wireless signal. Each of the at least two values corresponds to a single one of the channels. If the preamble is not detected using the at least two values, at least one value computed using the objective function for another one of the channels is used to attempt to detect the preamble of the frame.

In an implementation, a system comprises one or more modules configured to compute a plurality of values using an objective function for a scan of a wireless signal in which each of the plurality of values is computed for a single one of a plurality of channels of the wireless signal. The plurality of values is iteratively used to detect a preamble of a frame in the wireless signal for frame synchronization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Example Environment

Figure 1:
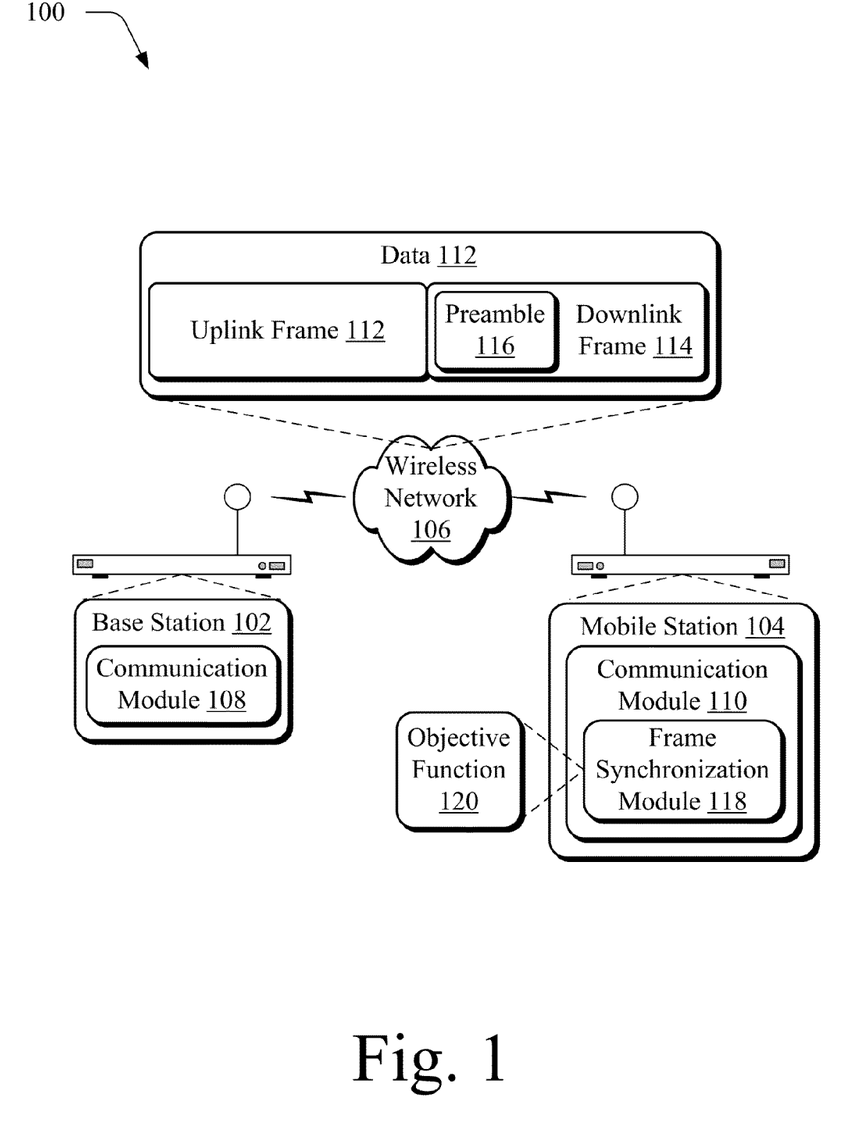
FIG. 1 is an illustration of an environment in an example implementation that is operable to perform frame synchronization techniques.

FIG. 1 is an illustration of an environment 100 in an example implementation that is operable to perform frame synchronization techniques. The environment 100 may include a wide variety of devices that communicate wirelessly, examples of which include a base station 102 and a mobile station 104 that are communicatively coupled via a wireless network 106. Although the base station 102 and the mobile station 104 are illustrated as examples, it should be readily apparent that a wide variety of wireless devices may employ the techniques described herein, such as between mobile stations, through use of a point to multi-point structure, and so on.

The base station 102 and the mobile station 104 are further illustrated as including respective communication modules 108, 110. The communication modules 108, 110 are representative of functionality of the respective devices to communicate via the wireless network 106. For example, the communication modules 108, 110 are configurable to use techniques such as Orthogonal Frequency Division Multiplexing ("OFDM") or Orthogonal Frequency Division Multiple Access ("OFDMA") to modulate a signal for wireless communication of data 112. In an implementation, the modulation is performed in accordance with WiMAX (IEEE 802.16) wireless communication standards.

The data 112 is communicated through the use of frames, examples of which are illustrated as an uplink frame 112 and a downlink frame 114. The uplink frame 112 specifies a frame for communicating data from the mobile station 104 to the base station 102 over the wireless network 106. The downlink frame 114 specifies a frame for communicating data from the base station 102 to the mobile station 104.

The download frame 114 further includes a preamble 116, which is used by a frame synchronization module 118 of the mobile station 104 to perform frame synchronization. Frame synchronization is typically performed first as part of a signal acquisition procedure by the mobile station 104 and involves identifying a start of the downlink frame 114. For example, the frame synchronization module 118 performs frame synchronization to determine timing and other characteristics of a signal transmitted by the base station 102 to the mobile station 104 via the wireless network 106. The frame synchronization module 118 then uses these characteristics to form a wireless communication channel between the base station 102 and the mobile station 104. A variety of different techniques are usable to perform frame synchronization, examples of which follow.

A conventional preamble signal structure contains data that describes an IDCell and segment. The IDCell and segment are used to identify which base station (e.g., tower) in which cell transmits the signal. Therefore, different preamble symbols are used from cell to cell and from segment to segment, and in an implementation each cell includes three segments. Consequently, values and/or structure (e.g., patterns) of preamble symbols in the preamble 116 of the downlink frame 114 from the base station 102 are different from other preambles received by the mobile station 104 from other base stations. Therefore, the base station 102 (and more particularly data 112 communicated to and/or from the base station) is uniquely identifiable from the other base stations.

Using these techniques, one of 114 different preamble symbol structure patterns are available based on the base station IDCell and segment when generating a subchannel for a preamble symbol. To generate the preamble 116, the base station 102 chooses one of the 114 preamble symbol structure patterns based on the base station's IDCell number and segment index.

Individual subcarriers within the segment are also modified to reflect this choice. For example, the subcarriers are modulated with the chosen preamble symbol structure pattern using a Binary Phase Shift Keying (BPSK) format. Using this format, each segment uses a different set of subcarriers. The number of subcarriers used for each segment is generally equal to a length of the preamble sequence, which is a number of symbols in the preamble 116.

Consequently, for conventional OFDMA signals the subcarrier set reflects the segment chosen by the base station 102. After the preamble symbol structure pattern is chosen, an Inverse Fast Fourier Transform (IFFT) or reverse IFFT is performed to convert the signal from a frequency domain into a time domain, and a cyclic prefix is added. The signal is then wirelessly transmitted by the base station 102 over the wireless network 106 to the mobile station 104.

Pilot subcarriers (e.g., control signals) are used to synchronize the mobile station 104 with the base station 102 using phase, frequency, and/or timing considerations. The pilot subcarriers are modulated by the base station 102 to reflect the preamble symbol structure pattern, with different pilot subcarrier sets chosen depending on the segment assigned to the particular base station. Once these pilot subcarriers are known by the mobile station 104, the pilot subcarriers are used for correcting magnitude (power) and/or phase shift offsets (distortions) in subsequent signals received by the mobile station 104) from the base station 102.

To aid in locating the preamble 116, the preamble 116 is differentiated from a remainder of a frame structure of the downlink frame 114 using a variety of techniques. For example, power used to transmit the preamble 116 is boosted above that of other symbols in the downlink frame 114 that are outside of the preamble 116, e.g., eight times that over non-preamble symbols, to 4 decibels, and so on. In another example, modulation of the preamble 116 is performed using BPSK while the rest of the downlink frame 114 is modulated using a different algorithm, such as Quadrature Phase Shift Keying (QPSK). In a further example, a subcarrier allocation of the preamble 116 is different from a subcarrier allocation of a remainder of the downlink frame 114. A variety of other examples are also contemplated, such as peak-to-average power ratio and so on.

Thus, the strategy followed in this example involves identification of one or more unique features of the preamble symbols (e.g., power, modulation, subcarrier allocation, and so on) such that the frame synchronization module 118 differentiates symbols in the preamble 116 from other symbols in the downlink frame 114. To differentiate the symbols, the frame synchronization module 118 employs an objective function 120 with a trial of frame start as an argument. The objective function 120 is constructed such that the function is optimized when a candidate that is a trial of frame start is the true frame start. Further discussion of an example objective function is found in relation to FIG. 5.

In a conventional technique, the value of the objective function is computed for each timing trial within a frame interval. A value taken from a single timing trial (e.g., a global optimum value) of a single channel is then selected as an estimate of a true frame start. The single timing trial is the optimal value of the objective function 120 from each of the timing trials for that single channel. Thus, in this conventional technique, other values of the timing trials for the single channel are ignored and not used to determine the true frame start. However, in some instances the value of the objective function 120 for the true frame start does not coincide with the global optimum value among each of the timing trials. Consequently, this conventional technique for frame synchronization could become deadlocked in some instances and thus fails to acquire the frame start.

Accordingly, the frame synchronization module 118 leverages the global optimum value, and in some instances also local optima values for the objective function 120 in order to locate the true frame start of the downlink frame 114. In this way, the frame synchronization module 118 helps to detect the true frame start in instances that would have resulted in frame synchronization deadlock using the above described conventional technique alone.

Figure 2:
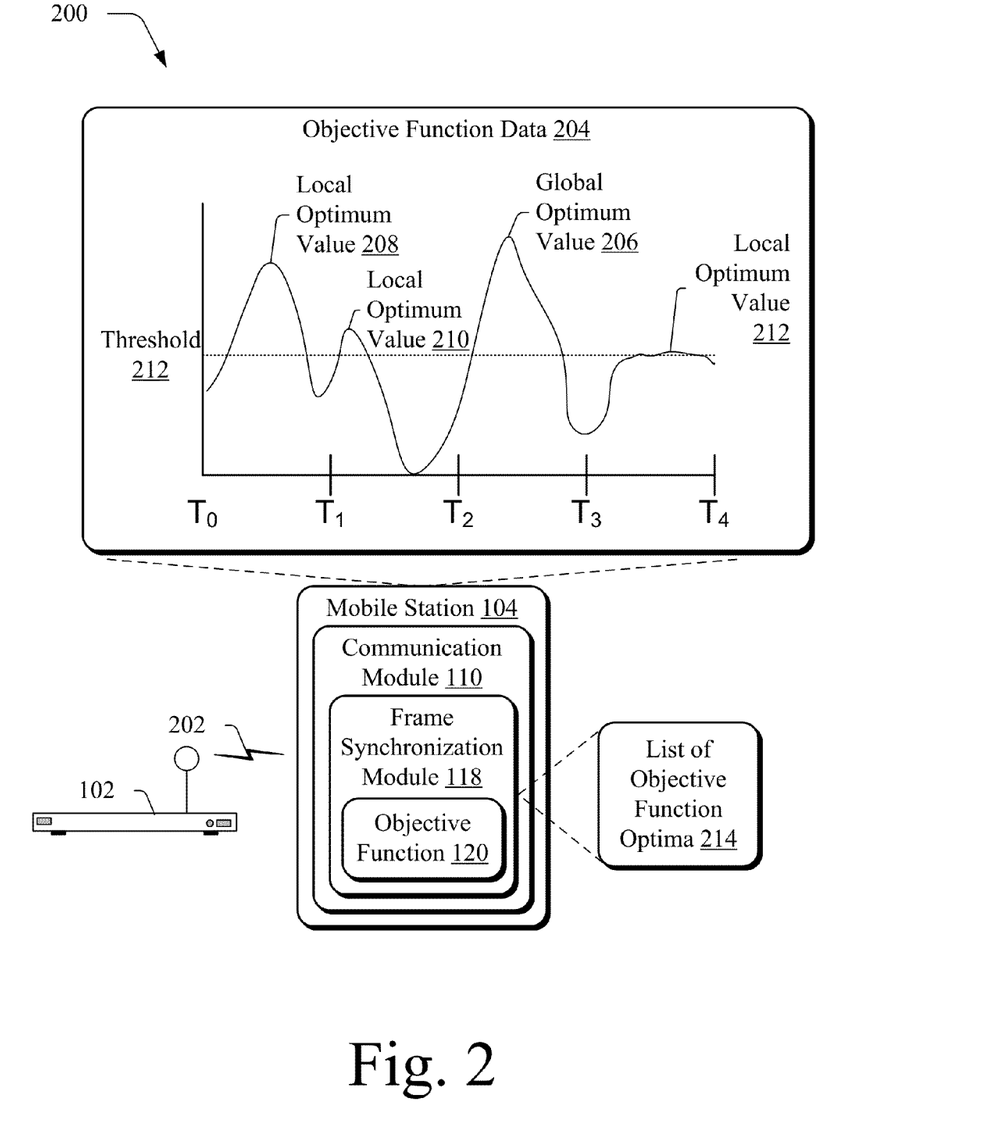
FIG. 2 is an illustration of a system in an example implementation showing a mobile station of FIG. 1 as evaluating data from an objective function for use in detecting a preamble.

FIG. 2 illustrates an example system 200 showing the mobile station 104 as evaluating a plurality of time trials for frame synchronization. The mobile station 104 includes the communication module 110, which includes functionality of the frame synchronization module 118 and an objective function 120. The objective function 120 is used to perform frame synchronization by determining a start of the downlink frame 114 through detection of the preamble 116.

The objective function 120 processes data describing a signal received from the base station 102 using normalized autocorrelation and arrives at objective function data 204, which is illustrated through use of a graph in FIG. 2. Further discussion of normalized autocorrelation is described in relation to the example methods section below.

The graph of the objective function data 204 specifies a plurality of time trials as segments denoted as "$T_0$," "$T_1$," "$T_2$," "$T_3$," through "$T_0$" along the x-axis. The y-axis represents a relative magnitude of respective values output by the objective function 120 at the corresponding times in response to the signal 202. In an implementation, the amount of time specified for each of the time trials is equal to or greater than an amount of time specified for transmitting the downlink frame 114, e.g., through one or more WiMAX standards.

As previously described, in some instances the value of the objective function 120 for the true frame start is not be the global optimum value 206 among each of the timing trials. However, of the remaining values in the objective function data 204, the local optima values 208-212 have an increased likelihood of being the true frame start when compared with other values of the objective function data 204. Therefore, in an implementation the frame synchronization module 118 maintains a list of objective function optima 214 that includes the global optimum value 206 and local optima values 208-212. Thus, the frame synchronization module 118 selects the global optimum value 206 and/or one of the local optima values 208-212 as candidates for detecting a true frame start, i.e., the start of the downlink frame 114, for frame synchronization.

In an implementation, the frame synchronization module 118 employs a two-scan frame synchronization technique in which the global optimum value 206 of an initial scan is first selected as a candidate. Should the global optimum value 206 fail as an indicator of the true frame start, the frame synchronization module 118 then selects one of the local optima values 208-212 from a second scan as a candidate. Thus, deadlocks and failures that were encountered using conventional techniques are minimized and even eliminated. Further discussion of these and other frame synchronization techniques are described in relation to the following methods.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable media, e.g., memory. The features of the frame synchronization techniques described below are platform-independent, meaning that the techniques may be implemented on a variety of commercial computing platforms having a variety of processors.

Example Methods

The following discussion describes frame synchronization techniques that are implemented utilizing the previously described systems and devices, as well as other systems and devices. Aspects of each of the methods are implemented in hardware, firmware, software, or a combination thereof. The methods are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
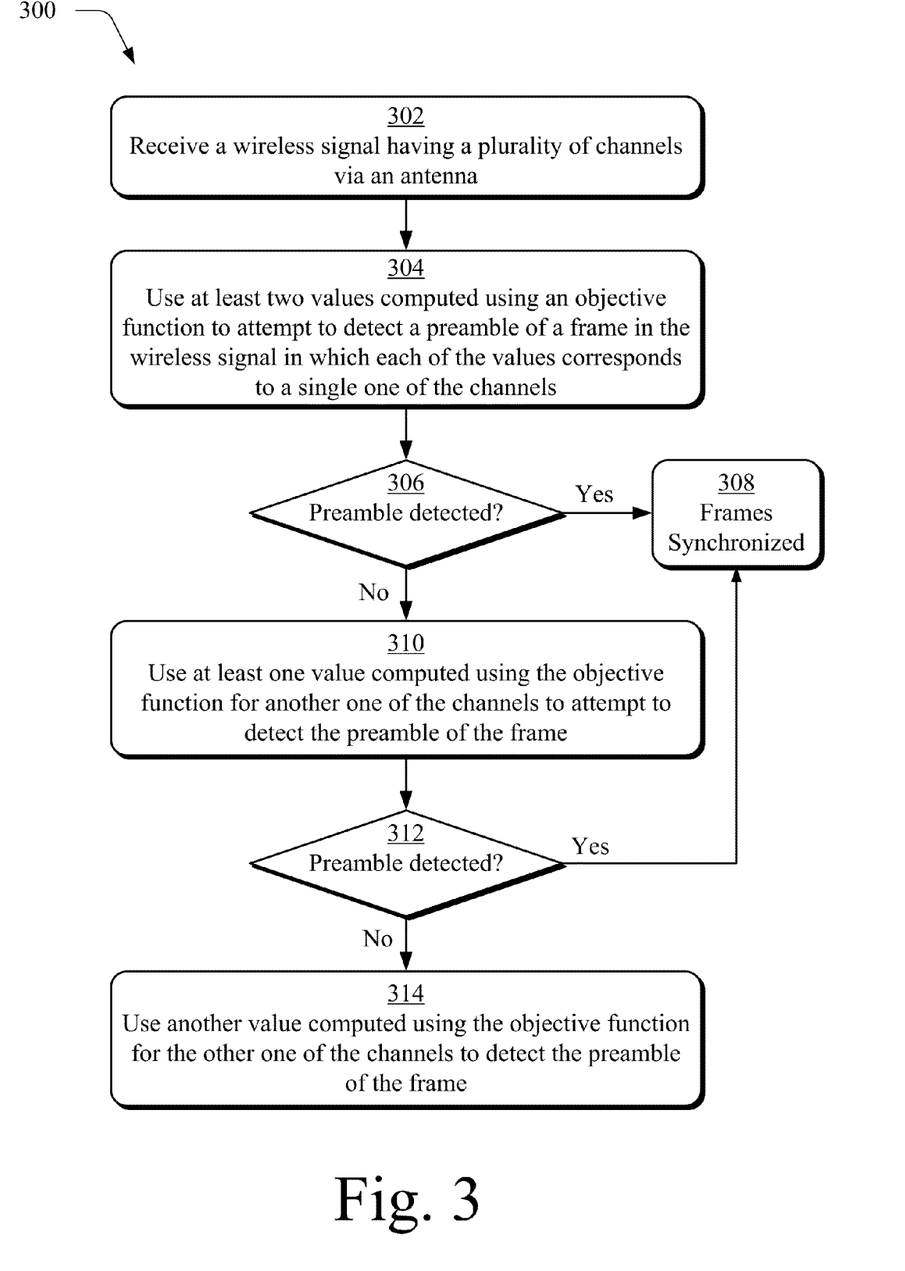
FIG. 3 is a flow diagram depicting a method in an example implementation in which a preamble is detected using a plurality of values computed for a single channel of a wireless signal having a plurality of channels.

FIG. 3 depicts a method 300 of detecting a preamble using a plurality of values computed for a single channel of a wireless signal having a plurality of channels. A wireless signal is received by a device via an antenna that has a plurality of channels (block 302). For example, the mobile station 104 receives the signal 202 wirelessly from the base station 102 via the antenna illustrated in FIG. 1.

At least two values are computed using an objective function such as a normalized autocorrelation function. The at least two values are used to attempt to detect a preamble of a frame in a wireless signal in which each of the values corresponds to a single one of the channels (block 304). Continuing with the previous example, the frame synchronization module 118 of the mobile station 104 uses the objective function 120 to compute objective function data 204. The objective function data 204 of FIG. 2 is segmented across a plurality of time trials such that each time trial has a respective local optima value, e.g., a maximum value for the objective function data for that time trial. The local optima values in this example correspond to a single channel of a plurality of channels included in the signal 202, such as when the signal complies with one or more IEEE 802.16 standards.

A determination is then made as to whether a preamble was detected (decision block 306) using the values. The at least two values are provided in succession (e.g., iteratively) for further processing to detect the preamble and therefore the true frame start as previously described. If the preamble is detected ("yes" from decision block 306), the frames are synchronized (block 308). The frame synchronization is then used to form a wireless communication channel between the base station 102 and the mobile station 104.

If the preamble is not detected ("no" from decision block 306), at least one value computed using the objective function for another one of the channels is used to attempt to detect the preamble of the frame (block 310). As before, the determination is then made as to whether the preamble is detected (decision block 312), and if so ("yes" from decision block 312) the frames are synchronized (block 308). If the preamble is not detected ("no" from decision block 312), another value computed using the objective function for the other one of the channels is used to detect the preamble of the frame (block 314).

The at least two values of block 304 are local optima values for respective time trials that correspond to a first channel. The other values computed by the objective function for blocks 310 and 314 are also local optima values. In this instance, however, the local optima values correspond to a second channel that is different than the first channel. In an implementation, the first and second channels are sub-channels of the signal 202 that are formed in compliance with one or more OFDM techniques such as IEEE 802.16. Therefore, in this method 300 the frame synchronization module 118 uses a plurality of local optima values for a single channel of the signal 202 to detect a preamble before using additional local optima values that correspond to additional channels of the signal 202. In other words, multiple candidates (values) of a single channel are used for frame synchronization before another candidate of another channel is used. Thus, this technique is referred to later in the following discussion as a multiple candidate technique. The multiple candidate technique may be incorporated with a single candidate technique (e.g., one candidate per channel) that was previously described to implement a two-scan frame synchronization technique, an example of which is described in relation to the following figure.

Figure 4:
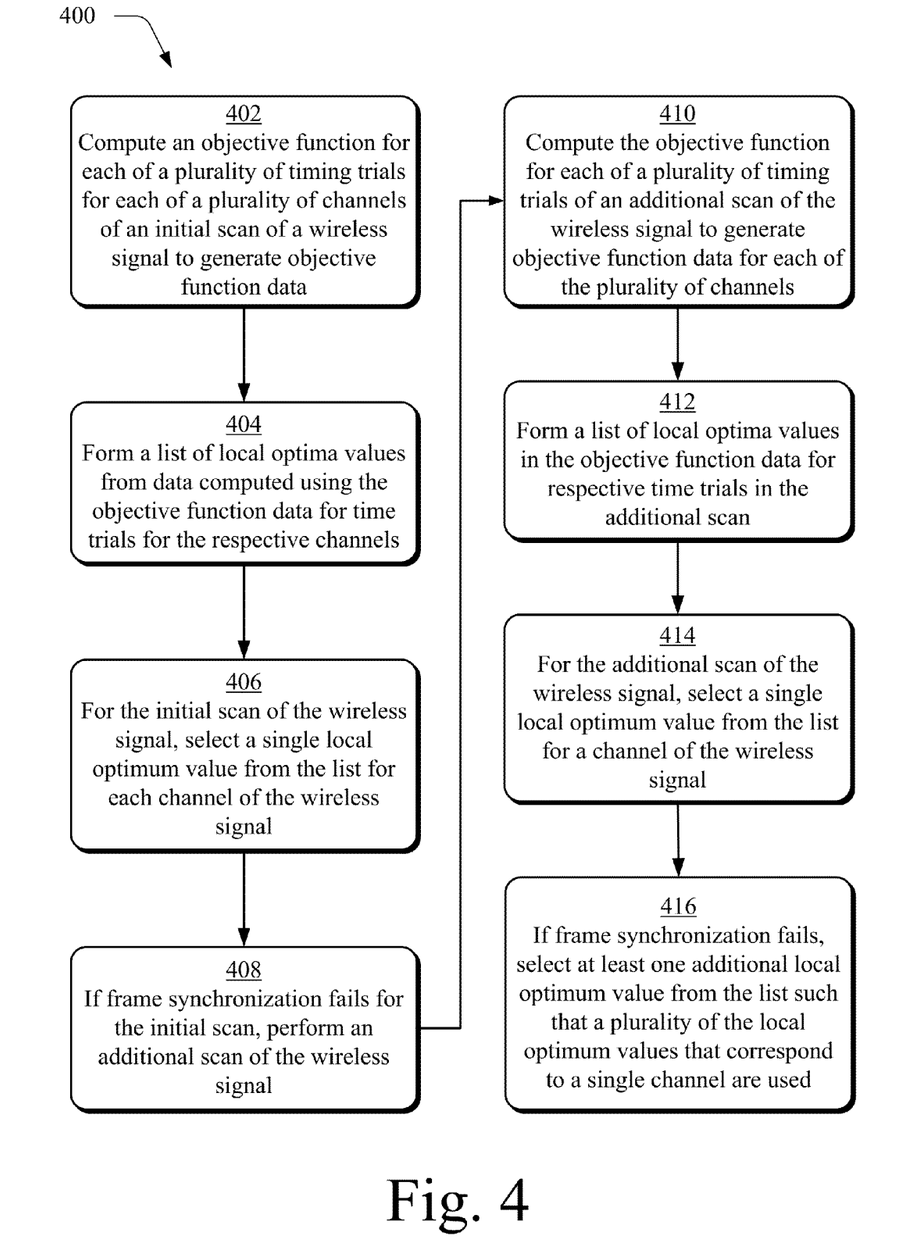
FIG. 4 is a flow diagram depicting a method in an example implementation of a two-scan frame synchronization technique.

FIG. 4 depicts a method 400 in an example implementation of a two-scan frame synchronization technique. An objective function is computed for each of a plurality of time trials of an initial scan of a wireless signal to generate objective function data (block 402). For example, the signal 202 is received at an antenna of the mobile station 104 during a signal acquisition process.

A list of local optima values is formed from data computed using the objective function for respective time trials (block 404). For example, the objective function data 204 as previously described includes a plurality of local optima values which includes a global optimum value 206 (as it is a local optima value of time trial $T_2$) as well as local optima values 208-212 of other time trials. These local optima values are collected to form a list of objective function optima 214 that is maintained by the mobile station 104.

For the initial scan of the wireless signal, a single local optimum value (e.g., a global optimum value 206) is selected from the list for each channel of the wireless signal to perform frame synchronization (block 406). In an implementation, the frame synchronization module 118 selects a first global optimum value that corresponds to a first channel of the signal 202. If the preamble cannot be detected using the first global optimum value and thus signal acquisition fails using the first global optimum value, a second global optimum value that corresponds to a second channel of the signal 202 is chosen. Therefore, this technique describes a single candidate per channel analysis that is performed for the initial scan using global optima values to initially detect a preamble 116.

However, if the frame synchronization fails, an addition scan of the wireless signal is performed (block 408). As before, the objective function is computed for each of a plurality of time trials of the additional scan to generate objective function data (block 410). A list of local optima values is also formed from data computed using the objective function for respective time trials in the additional scan (block 412). This list may be the same as or different from the list formed at block 404.

For the additional scan of the wireless signal, a single global optimum value is selected from the list for each channel of the wireless signal to perform frame synchronization (block 414). Thus, functions performed for the additional scan of block 410-414 in this example mimic functions performed for the initial scan of blocks 402-404.

If the frame synchronization fails, however, at least one additional local optimum value is selected from the list to perform frame synchronization such that a plurality of the local optimum values that correspond to a single channel are used for frame synchronization (block 416). In an implementation, these techniques employ the method 300 described in relation to FIG. 3 that details use of a plurality of local optima values for a single channel of a wireless signal to detect a preamble before using additional local optima values.

Therefore, in the described two-scan frame synchronization technique a one channel/one candidate technique (e.g., using the global optima value) is first used to detect a preamble in the initial scan. If this technique is not successful, a one channel/multiple candidate technique is employed to detect the preamble. Thus, the two-scan frame synchronization technique leverages the increased accuracy of the multiple candidate technique and the efficiency of the one candidate technique. Although multiple scans were described in relation to method 400, it should be readily apparent that the techniques may employ a single scan, e.g., formation of a single list to perform the single/multiple candidate techniques.

Figure 5:
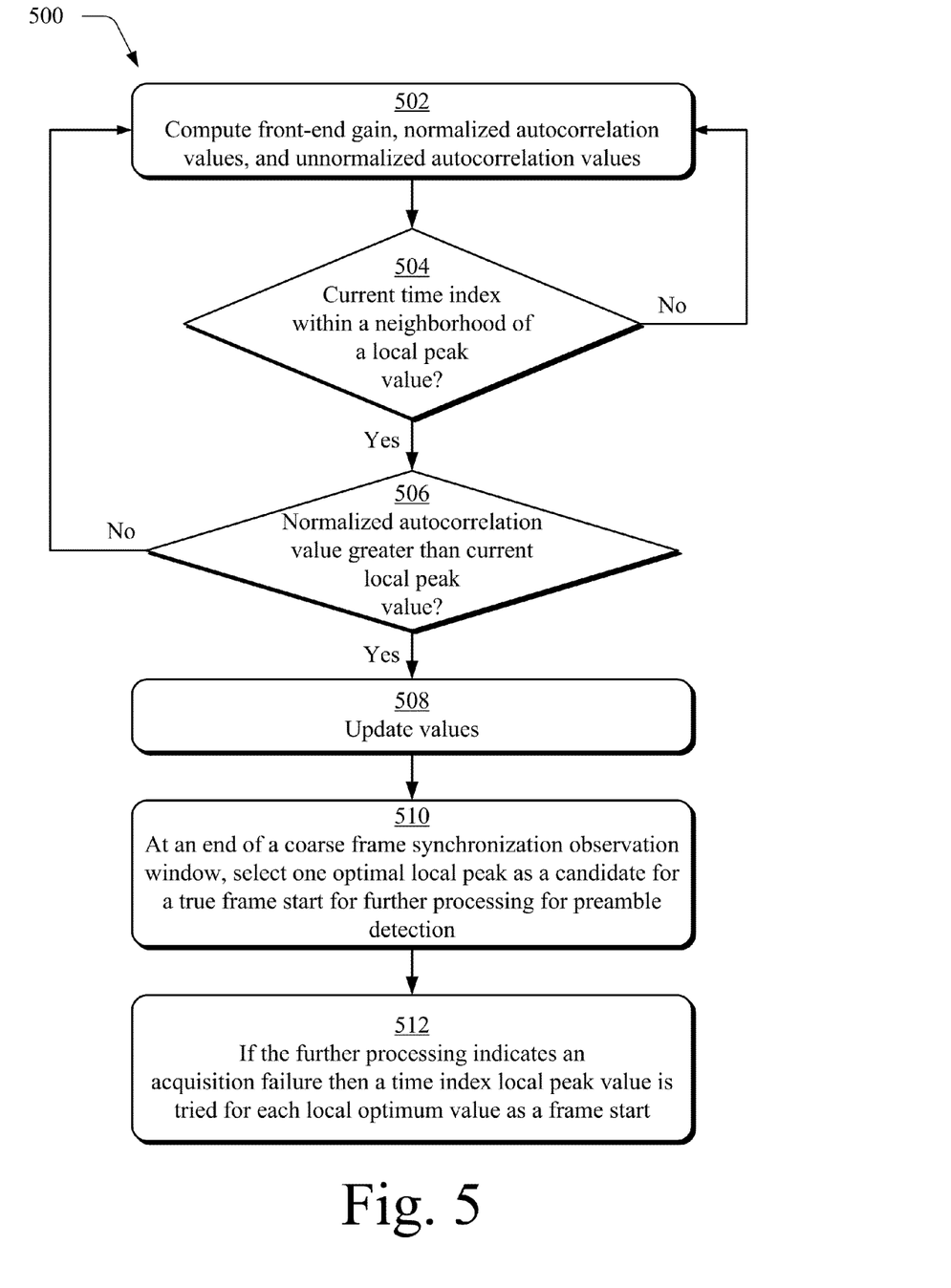
FIG. 5 is a flow diagram depicting a method in an example implementation in which a two-scan frame synchronization technique uses normalized autocorrelation as an objective function.

FIG. 5 depicts a method 500 in an example implementation in which a two-scan frame synchronization technique uses normalized autocorrelation as an objective function. A front-end gain, a normalized autocorrelation, and an unnormalized autocorrelation are computed (block 502). The front-end gain is computed by measuring a power of the preamble 116 as compared to a remainder of a downlink frame 114.

The normalized correlation is computed using the following expression. This expression leverages a unique subcarrier allocation pattern with a preamble symbol to distinguish preamble symbols from other symbols in the frame. For example, in a frequency domain each third subcarrier is used to modulate the preamble sequence. In a time-domain, the signal is repeated three times. Thus, these features may be used to locate an OFDM preamble symbol without performing a FFT. Accordingly, the following objective function to compute a normalized autocorrelation C(k) is constructed to use this unique signal repetition pattern within a preamble symbol to aid in detecting a preamble:

$$C(k) = \frac{\left| \sum_{l=0}^{2*round(N/3)-1} z_{k-l-round(N/3)} z_{k-l}^* \right|^2}{\left[ \frac{1}{2} \sum_{l=0}^{2*round(N/3)-1} |z_{k-l-round(N/3)}|^2 + |z_{k-l}|^2 \right]^2},$$

$$k = T_0, \ldots, T_0 + W - 1$$

In the above expression, the following variables and expressions are defined as follows:
  yk is a k-th received time-domain Nyquist sample;
  $z_k$ is a k-th received differential time-domain sample and is equal to $y_k - y_{k-1}$;
  N is FFT size and not a multiple of 3;
  $T_0$ is a start time of frame synchronization;
  W is a frame synchronization observation interval; and
  C(k) is the objective function, which performs a normalized autocorrelation of a received signal.

Further, the estimate of the true frame start "τ" (and the preamble) is expressed as follows:

$$\tau = \underset{k \in \Omega}{\arg\max}\, C(k)$$

$$\Omega = \{k : C(k) \geq ThreshId, \forall\, k\}$$

Thus, as shown in the above expression the estimate of the frame is greater than a predefined threshold as previously described.

The unnormalized autocorrelation A(k) is computed using a numerator of the normalized autocorrelation expression C(k) above, which is expressed as follows:

$$A(k) = \left| \sum_{l=0}^{2*round(N/3)-1} z_{k-l-round(N/3)} z_{k-l}^* \right|^2$$

A current time index is checked to determine if the current time index is within a neighborhood of a local optimum value (decision block 504). If not ("no" from decision block 504), the method 500 returns to block 502. If so ("yes" from decision block 504), the method 500 proceeds to block 506. A variety of different techniques may be used to determine if the current time index is within the neighborhood of the local optimum value. For example, the frame synchronization module 118 is configurable to identify entry into the neighborhood of a local optimum value if the C(k) is continuously greater than the threshold for a predetermined amount of time. The frame synchronization module 118 is also configurable to identify an exit from the neighborhood of the local optimum value if the C(k) is continuously less than the threshold for a predetermined amount of time.

In another example, the frame synchronization module 118 is configured to identify entry into the neighborhood of a local optimum value if C(k) is greater than a threshold and a timer to record local optimum value timing is 0. In this example, the frame synchronization module 118 identifies an exit from the neighborhood of a local optimum value if the timer to record the local optimum value timing has expired. The amount of time used by the timer (i.e., the time out duration) is equal to a duration T of a single symbol.

A determination is then made as to whether the normalized autocorrelation value is greater than a current local optimum value (decision block 506). If not ("no" from decision block 506), the method 500 returns to block 502. If so ("yes" from decision block 506), the values are updated (block 508). The current local peak value is updated using the normalized autocorrelation value such that max_C=C(k). Other values are also updated, which includes the unnormalized autocorrelation value (max_A=A(k)), the front-end gain (max_G=G(k)), and the time (max_T=k).

At an end of a coarse frame synchronization observation window, one local optimal value that is optimal when compared to other local optimal values (i.e., the global optimal value) is selected as a candidate for a true frame start for further processing to detect the preamble (block 510). The coarse frame synchronization observation window may be set to an amount of time to perform a scan, e.g., to perform a desired number of time trials.

At the end of this time, a determination is made as to whether there are values having a max_C that is greater than a high threshold, which indicates that the system (e.g., the base station 102 and the mobile station 104) operates at a high signal-to-noise ratio (SNR). If so, among each of the entries having a max_C greater than the high-threshold, a max_A/max_G$^2$ is found among them and the corresponding max_T is selected as the frame start. In not, a maximum max_C is found and the corresponding max_T is selected as the frame start.

If the further processing indicates an acquisition failure, then a time index local peak value is tried for each local optimum value as a frame start (block 512) until the preamble is detected, e.g., in a descending order of local optima values. The time index values max_T for each of the local optima values are used successively for further processing as described above to detect the preamble 116. In an implementation, blocks 502-510 are performed for an initial scan while blocks 502-512 are performed for the additional scan. Thus, this method 500 employs the two-scan frame synchronization technique described above to leverage the increased accuracy of the multiple candidate technique with the efficiency of the one candidate technique. However, a variety of other examples are also contemplated, e.g., a single scan using multiple candidates, multiple scans in which the initial scan uses the single candidate techniques and the additional scan uses both the single scan and the multiple scan techniques, and so on.

Example Device

Figure 6:
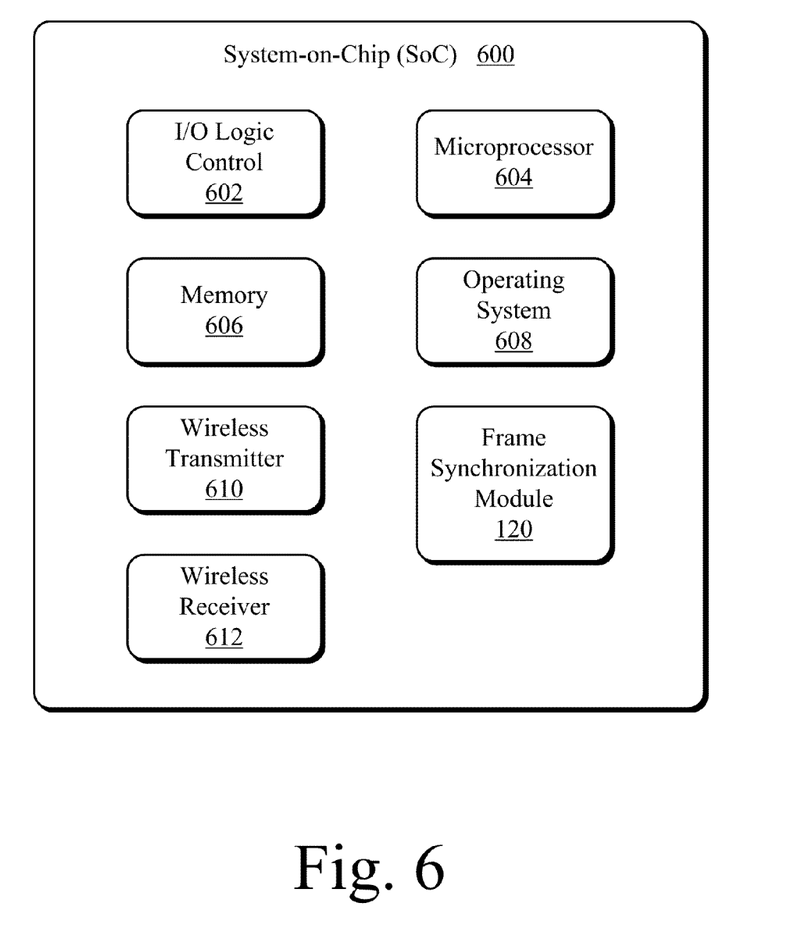
FIG. 6 is an illustration of an example device configured as a system-on-chip (SoC) that is operable to perform the frame synchronization techniques.

FIG. 6 illustrates an example System-on-Chip (SoC) 600, which can implement various embodiments of the frame synchronization techniques in a variety of wireless devices. An SoC may be implemented in a fixed or mobile device (e.g., mobile station 104), a media device, computer device, television set-top box, video processing and/or rendering device, appliance device, gaming device, electronic device, vehicle, workstation, and/or in any other type of device that may communicate wirelessly in a local or personal area network. Examples of some of these are shown in FIGS. 1 and 2.

SoC 600 can be integrated with electronic circuitry, a microprocessor, memory, input-output (I/O) logic control, communication interfaces and components, other hardware, firmware, and/or software needed to run an entire device. SoC 600 can also include an integrated data bus (not shown) that couples the various components of the SoC for data communication between the components. A device that includes SoC 600 can also be implemented with many combinations of differing components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of random access memory (RAM), a low-latency nonvolatile memory (e.g., flash memory), read only memory (ROM), and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, wireless LAN (WLAN) or PAN (WPAN) components, other hardware, firmware, and/or software.

SoC 600 may also include a wireless transmitter 610 and wireless receiver 612 that may be communicatively coupled to an antenna. Examples of these various components, functions, and/or entities, and their corresponding functionality, are described with reference to the respective components of the examples of FIGS. 1 and 2.

The frame synchronization module 120 in SoC 600, either independently or in combination with other entities, can be implemented as computer-executable instructions maintained by memory 606 and executed by microprocessor 604 to implement various embodiments and/or features of the tools. In another example, the frame synchronization module 120 may also be provided integral with other entities of the SoC, such as integrated with one or both of wireless transmitter 610, wireless receiver 612, I/O logic control 602, and so on. Alternatively or additionally, the frame synchronization module 120 and the other components can be implemented as hardware (e.g., fixed logic circuitry), firmware, or any combination thereof that is implemented in connection with the I/O logic control 602 and/or other signal processing and control circuits of SoC 600.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device-implemented method comprising:
    using an objective function to form a list of values for a plurality of time trials, the time trials taken from a scan of a wireless signal having a plurality of channels;
    selecting a single one of the values for each of the plurality of channels respectively to detect a synchronizing signal of a frame in the wireless signal, the synchronizing signal of the frame comprising an Orthogonal Frequency Division Multiple Access (OFDMA) symbol of the frame; and if the synchronizing signal is not detected as a result of the selecting, choosing at least one additional value from the list for one of the plurality of channels to detect the synchronizing signal of the frame in the wireless signal.

2. The device-implemented method of claim 1, wherein the choosing is performed such that if the synchronizing signal is not detected after the at least one additional value from the list that corresponds to the one of the plurality of channels is chosen, one or more values for another one of the plurality of channels are chosen to detect the synchronizing signal.

3. The device-implemented method of claim 1, wherein the selecting and the choosing are performed such that a plurality of the values for a single one of the plurality of channels is used to detect the synchronizing signal.

4. The device-implemented method of claim 1, wherein the single one of the values used for the selecting is a global optimum value.

5. The device-implemented method of claim 4, wherein the at least one additional value used in the choosing is a local optimum value.

6. The device-implemented method of claim 1, wherein the objective function is used to compute a normalized autocorrelation.

7. The device-implemented method of claim 1, wherein the values included in the list are above a predefined threshold.

8. The device-implemented method of claim 1, further comprising:
   computing an initial list of values using the objective function for a plurality of time trials of an initial scan of the wireless signal;
   using a single one of the values from the initial list for each of the plurality of channels to detect the synchronizing signal; and
   if the synchronizing signal is not detected for the initial scan as a result of the using, performing the scan that serves as a basis to form the list of values for the plurality of time trials.

9. The device-implemented method of claim 1, further comprising receiving the wireless signal from a base station of a point to multi-point wireless network.

10. The device-implemented method of claim 1, wherein the synchronizing signal includes pilot subcarriers having a modulation that is different from a modulation of other subcarriers of the frame.

11. A mobile device comprising:
   an antenna; and
   one or more modules to perform frame synchronization by:
      receiving a wireless signal having a plurality of channels via the antenna;
      using at least one value computed using an objective function to attempt to detect a synchronizing signal of a frame in the wireless signal in which the at least one value corresponds to a single one of the plurality of channels, the synchronizing signal of the frame comprising an Orthogonal Frequency Division Multiple Access (OFDMA) symbol of the frame; and
      if the synchronizing signal is not detected using the at least one value for the single one of the plurality of channels, using another value computed using the objective function for another one of the plurality of channels to attempt to detect the synchronizing signal of the frame.

12. The mobile device of claim 11, wherein the one or more modules are configured to use the at least one value successively to attempt to detect the synchronizing signal of the frame.

13. The mobile device of claim 12, wherein the synchronizing signal is generated based on an identifier of a base station that transmits the wireless signal.

14. The mobile device of claim 12, wherein the objective function is used to compute a normalized autocorrelation from data describing the wireless signal.

15. The mobile device of claim 11, wherein the one or more modules are further configured to use the other value computed using the objective function for the other one of the plurality of channels to detect the synchronizing signal of the frame if the synchronizing signal is not detected using the at least one value for the other one of the plurality of channels.

16. One or more computer-readable memory devices embodying computer-executable instructions that, when executed by a processor, implement a frame synchronization module configured to:
   compute a plurality of values using an objective function, the plurality of values to analyze a scan of a wireless signal having a plurality of channels;
   use one or more of the plurality of values to attempt to detect a synchronizing signal of a frame in the wireless signal, the one or more values corresponding to a single one of the plurality of channels, the synchronizing signal of the frame comprising an Orthogonal Frequency Division Multiple Access (OFDMA) symbol of the frame; and
   if the synchronizing signal is not detected using the one or more values for the single one of the plurality of channels, use another value computed using the objective function for another one of the plurality of channels to attempt to detect the synchronizing signal of the frame.

17. The one or more computer-readable readable memory devices of claim 16, wherein the objective function is configured for use in computing a normalized autocorrelation of the wireless signal.

18. The one or more computer-readable readable memory devices of claim 16, wherein the frame synchronization module is further configured to:
   compute another plurality of values using the objective function, the other plurality of values to analyze the scan of the wireless signal, wherein each of the other plurality of values corresponds to another one of the plurality of channels that is different than the single one of the plurality of channels; and
   iteratively use one or more of the other plurality of values to detect the synchronizing signal of the frame.

19. The one or more computer-readable readable memory devices of claim 16, wherein the wireless signal includes a cyclic prefix associated with the OFDMA symbol of the frame.

20. The one or more computer-readable readable memory devices of claim 16, wherein the one or more computer-readable memory devices are associated with or embodied as part of a system on a chip (SoC).

* * * * *